United States Patent
Schumacher

(10) Patent No.: US 12,453,937 B2
(45) Date of Patent: Oct. 28, 2025

(54) FILTER ELEMENT FOR AN AIR FILTRATION DEVICE OF A MOTOR VEHICLE AND AIR FILTRATION DEVICE

(71) Applicant: Mercedes-Benz Group AG, Stuttgart (DE)

(72) Inventor: Eric Schumacher, Stuttgart (DE)

(73) Assignee: Mercedes-Benz Group AG, Stuttgart (DE)

(*) Notice: Subject to any disclaimer, the term of this patent is extended or adjusted under 35 U.S.C. 154(b) by 397 days.

(21) Appl. No.: 17/920,577

(22) PCT Filed: Apr. 21, 2021

(86) PCT No.: PCT/EP2021/060298
§ 371 (c)(1),
(2) Date: Oct. 21, 2022

(87) PCT Pub. No.: WO2021/214094
PCT Pub. Date: Oct. 28, 2021

(65) Prior Publication Data
US 2023/0158433 A1    May 25, 2023

(30) Foreign Application Priority Data
Apr. 22, 2020    (DE) .................... 10 2020 110 940.7

(51) Int. Cl.
B01D 46/00    (2022.01)
B01D 46/52    (2006.01)
(Continued)

(52) U.S. Cl.
CPC ..... B01D 46/0006 (2013.01); B01D 46/0004 (2013.01); B01D 46/521 (2013.01);
(Continued)

(58) Field of Classification Search
CPC ............ B01D 46/0006; B01D 46/0004; B01D 46/521; B01D 2265/025; B01D 46/4227;
(Continued)

(56) References Cited

U.S. PATENT DOCUMENTS

| 4,002,443 A | 1/1977 | Lorenz |
| 6,174,343 B1 | 1/2001 | Bloomer |

(Continued)

FOREIGN PATENT DOCUMENTS

| DE | 10 2007 018 215 A1 | 10/2008 |
| DE | 20 2013 007 154 U1 | 10/2013 |

(Continued)

OTHER PUBLICATIONS

PCT/EP2021/060298, International Search Report dated May 31, 2021 (Two (2) pages).

(Continued)

*Primary Examiner* — Jennifer Dieterle
*Assistant Examiner* — Qianping He
(74) *Attorney, Agent, or Firm* — Crowell & Moring LLP

(57) ABSTRACT

A filter element for an air filtration device of a motor vehicle includes a frame where the frame has an elastically deformable front wall which extends perpendicularly to an insertion direction of the filter element in a receiving chamber of a housing of the air filtration device. A fastening element is disposed on the frame where a lid of the air filtration device is fixable on the fastening element and where the lid is configured for closing the receiving chamber. An insertion bevel is formed on the frame wherein via the insertion bevel the front wall can be brought into an elastically deformed state during an insertion of the filter element into the receiving chamber. An inherently rigid component is mounted on the frame in an area of the front wall where the (Continued)

fastening element is formed integrally with the component and the component has the insertion bevel.

8 Claims, 10 Drawing Sheets

(51) Int. Cl.
  *B60H 3/06* (2006.01)
  *F02M 35/024* (2006.01)
(52) U.S. Cl.
  CPC ..... *B60H 3/0616* (2013.01); *F02M 35/02416* (2013.01); *B01D 2265/025* (2013.01); *B60H 2003/065* (2013.01); *F02M 35/0245* (2013.01); *F02M 35/02491* (2013.01)
(58) Field of Classification Search
  CPC .............. B01D 2279/40; B60H 3/0616; B60H 2003/065; F02M 35/02416; F02M 35/0245; F02M 35/02491
  USPC .................................................. 55/497, 357
  See application file for complete search history.

(56) References Cited

U.S. PATENT DOCUMENTS

| | | | |
|---|---|---|---|
| 11,439,939 | B2 | 9/2022 | Schumacher |
| 2020/0230540 | A1* | 7/2020 | Schumacher ........ B60H 3/0616 |
| 2020/0269174 | A1* | 8/2020 | Schumacher ........ B01D 46/521 |

FOREIGN PATENT DOCUMENTS

| | | |
|---|---|---|
| DE | 10 2017 007 497 A1 | 2/2019 |
| EP | 2 692 559 A1 | 2/2014 |
| KR | 10-2020-0019985 A | 2/2020 |
| KR | 10-2020-0020898 A | 2/2020 |
| RU | 33 905 U1 | 11/2003 |
| RU | 67 026 U1 | 10/2007 |
| RU | 2 656 753 C2 | 5/2018 |

OTHER PUBLICATIONS

German-language German Office Action issued in German application No. 10 2020 110 940.7 dated Dec. 8, 2020 (Eight (8) pages).
U.S. Patent Application, "Filter Element for an Air Filter Device of a Motor Vehicle, and Air Filter Device", filed Oct. 21, 2022, Inventor Eric Schumacher.
U.S. Patent Application, "Air Filter Device and Filter Element for an Air Filter Device of a Motor Vehicle", filed Oct. 21, 2022, Inventor Wolfgang Enderle et al.
Russian Office Action issued in Russian application No. 2022129746/04(065110) dated May 5, 2023, with partial German and English translation (Eleven (11) pages).
Korean-language Office Action issued in Korean Application No. 10-2022-7035449 dated Mar. 25, 2025 (8 pages).

* cited by examiner

FILTER ELEMENT FOR AN AIR FILTRATION DEVICE OF A MOTOR VEHICLE AND AIR FILTRATION DEVICE

BACKGROUND AND SUMMARY OF THE INVENTION

The invention relates to a filter element for an air filtration device of a motor vehicle, with a frame which at least partially surrounds a filter material. The frame comprises an elastically deformable front wall, which extends substantially perpendicular to an insertion direction. The filter element can be inserted into a receiving chamber of a housing of the air filtration device, in the insertion direction. At least one fastening element is arranged on the frame. A lid of the air filtration device can be fixed on the at least one fastening element, the lid being designed for the closure of the receiving chamber. Furthermore, the invention relates to an air filtration device with such a filter element.

DE 10 2017 007 497 A1 describes a filter element for an air filtration device of a motor vehicle, wherein a filter material is bordered by a frame. The frame has a front wall which extends perpendicular to an insertion direction, in which the filter element is inserted into a housing of the air filtration device. On both sides of the front wall, which are perpendicular to the insertion direction and opposite to one another, respective fastening elements are arranged, which are connected with the front wall by means of a connecting bar. Through-openings are formed in the fastening elements, into which latch pins are inserted. The latch pins are positioned rotationally on a lid of the air filter housing. If the filter element is inserted into the air filter housing, the latch pins can be guided through the through-openings and twisted, so that the lid is fixed on the housing and the housing is thereby sealed. The front wall can be elastically deformed or compressed in order to introduce the filter element into the housing. For the purpose of this compression of the front wall, respective actuating plates are arranged on the fastening elements, which can be moved towards one other. While the front wall is elastically deformed in this way, the filter element can be inserted into the housing. If the actuating plates are then released again, the fastening elements then engage behind webs, which are formed on the respective walls of the housing.

Such an embodiment of the filter element entails a pressure having to be simultaneously applied from the outside on both actuating plates during the elastic deforming of the front wall, while the filter element attached to the frame is inserted into the housing. This makes the handling of the filter element somewhat cumbersome.

It is therefore the object of the present invention to provide a filter element of the kind mentioned above, which can be particularly easily integrated into a housing of an air filtration device, and to specify an air filtration device with such a filter element.

The filter element according to the invention for an air filtration device of a motor vehicle has a frame which at least partially surrounds a filter material of the filter element. The frame comprises an elastically deformable front wall. The front wall extends perpendicular to an insertion direction, in which the filter element can be inserted into a receiving chamber of a housing of the air filtration device—also referred to in the following as "air filter housing" or "housing." At least one fastening element is arranged on the frame. A lid of the air filtration device can be fixed on the at least one fastening element, the lid being designed for the closure of the receiving chamber. Furthermore, at least one insertion bevel is formed on the frame, by means of which the front wall can be brought into an elastically deformed state during the insertion of the filter element into the receiving chamber. In the elastically deformed state, a longitudinal dimension of the front wall is smaller than in an original state of the front wall, in which the front wall is not deformed, and due to this feature, the front wall can be held indented in the receiving chamber of the housing by a housing opening that is narrower in comparison to the front wall of the filter element.

The fastening element that is formed integrally with the insertion bevel is provided by an inherently rigid component, which is mounted on the frame of the filter element in the area of the front wall. Thus, on the one hand, a force applied to the insertion bevel is directly employed to elastically deform the front wall when introducing the filter element into the receiving chamber through the housing opening and, on the other hand, a good closure element can work well with the fastening element, the closure element ensuring the attachment or retention of the lid on the air filter housing.

The insertion bevel formed on the frame thus automatically ensures the elastic deformation of the front wall when introducing the filter element into the receiving chamber, the front wall springing back into its original shape as soon as the filter element has reached its installation position, whereby the filter element is held in the housing with an indent. No particular actuating plates or similar are needed in order to compress or elastically deform the front wall in the longitudinal direction, which runs perpendicular to the insertion direction and perpendicular to the height of the front wall. Rather, it is sufficient to introduce the filter element into the receiving chamber in the insertion direction, wherein the insertion bevel then causes the elastic deformation of the front wall. This is because the force acting on the insertion bevel during the insertion or introduction into the air filter housing inevitably ensures that the front wall is brought into an elastically deformed state. As a result, the filter element can easily be installed into the housing and secured therein.

For the filter element having the at least one insertion bevel, it is in particular advantageous that the air filtration device of the motor vehicle can only then be operated if the filter element is installed or integrated into the receiving chamber. This is because the at least one fastening element, which is part of the filter element, is necessary for fixing the lid of the air filtration device to the air filter housing. In other words, the attachment of the lid to the housing is not possible if the filter element is not integrated into the receiving chamber of the housing. Incorrect operation of the air filtration device can thereby be prevented.

Because the at least one fastening element is formed integrally with the insertion bevel, it is simultaneously ensured that the at least one fastening element is aligned in the correct position for the mounting or attachment of the lid on the air filter housing, as long as the filter element is brought into its installation position, which is indented relative to the housing.

For a secure attachment of the lid to the air filter housing, it is sufficient if simply one or precisely one fastening element is arranged on the frame of the filter element, the fastening element serving for the affixing or attachment of the lid. This also simplifies the attachment of the lid to the housing, as only one closure element needs to work with the fastening element in order to close the receiving chamber, by means of the lid. The filter element can thereby be so inserted, that it is first introduced through the housing opening into the receiving chamber diagonal to the side opposite to the side wall of the frame, which has the insertion bevel and the component that supports the fastening element, and the filter element is secured behind a housing projection, and the corner with the insertion bevel is subsequently introduced into the receiving chamber.

It may in particular be provided that the fastening element protrudes from the front wall counter to the insertion direction. This guarantees a good accessibility of the fastening element for a closure element of the lid. In particular, the fastening element can be encompassed by the closure element of the lid.

Preferably, the insertion bevel is wedge-shaped, due to which the insertion bevel has a greater width in the direction of the longitudinal dimension of the front wall in an end region near the front wall than in an end region of the insertion bevel that is far away from the front wall, which is formed by at least one guide slope that is aligned diagonally to a side wall of the frame. By using a wedge-shaped insertion bevel of this kind, the elastic deforming of the front wall when inserting the filter element into the receiving chamber can be effectively achieved. This is because the wedge-shaped insertion bevel is inherently rigidly formed, which ensures that a force which acts on roughly at least one diagonally aligned guide slope of the insertion bevel consistently leads to a deformation—or a yielding—of the elastic front wall.

Preferably, the insertion bevel and the component that comprises the fastening element have a locating flange, which lies on the front wall, as well as a base part, which lies on the side wall of the frame. A stable connection with the filter element, or with the frame of the filter element, is ensured by the flat connection of the component to the front wall and side wall. In this way, the assembly is durable against being acted on by forces, on one side by the insertion bevel, on the other side by the fastening element.

Preferably, the insertion bevel comprises a stiffening element, which is arranged between the base part and the at least one guide slope of the insertion bevel. The insertion bevel thereby obtains the necessary stiffness in a material-saving way, with a filigree construction.

Preferably, the insertion bevel has an end face, by which an abutment is provided. The abutment is designed to engage behind a supporting element of the air filter housing for the filter element integrated into the receiving chamber. It can thereby be ensured that then, if the supporting element of the housing lies on the abutment, the filter element cannot be unintentionally removed from the receiving chamber.

This is then in particular advantageous if the filter element should be installed upside down, so needs to be inserted into the receiving chamber against gravity. This is because the abutment that is provided through the end face of the insertion bevel ensures that the filter element that is arranged in the receiving chamber does not move back out of the receiving chamber as a result of gravity. The filter element therefore does not need to be fixed manually or by means of another aid before the lid is attached to the housing. Instead, the indented arrangement of the abutment on the supporting element already secures the filter element in its position in the receiving chamber, while the lid is then secured or fixed to the fastening element in order to close the receiving chamber.

A particularly compact embodiment of the filter element can be achieved if the end face of the insertion bevel is aligned with the front wall. Additionally, the insertion bevel then very directly introduces the force into the front wall, which causes the elastic deformation of the front wall.

It has been shown that it is furthermore advantageous if the at least one fastening element has at least one supporting part, which, when the lid is fixed to the air filter housing, is engaged from behind by a corresponding supporting part of the lid. A very secure fixing of the lid to the housing by means of the at least one fastening element can thereby be achieved.

The at least one supporting part can in particular be formed in the manner of a bar or wing that protrudes from a basic body of the fastening element parallel to the front wall, which can be engaged from behind by the corresponding supporting part of the lid. This is because a wing of this kind is very easily accessible for the corresponding supporting part.

In particular, if a wing of this kind has a ramp-like shape in an end region, on which the corresponding supporting part is moved along during the fixing of the lid, a very tight-fitting arrangement of the lid on the housing can be achieved.

The air filtration device according to the invention for a motor vehicle has a filter element according to the invention, wherein the filter element is integrated into a receiving chamber which is formed in a housing of the air filtration device.

The air filtration device can in particular be formed as an air filtration device of an air conditioner or ventilation device of the motor vehicle. Moreover, the air filtration device can be provided for an intake of an internal combustion engine of the motor vehicle, i.e., as a filter for the air drawn in by an internal combustion engine.

Preferably, the receiving chamber can be closed by means of a lid of the air filtration device, wherein the lid can be fixed to the at least one fastening element of the filter element. In this way it is ensured that the receiving chamber can only be closed by means of the lid when the filter element is correctly installed in the air filter housing.

Preferably, an intake is formed on at least one housing wall of the housing, in which the at least one fastening element is accommodated. The intake thereby comprises a supporting element, which lies on an end face of the insertion bevel of the filter element. Thus, when the filter element is introduced or integrated into the receiving chamber of the housing, the end face, more precisely the part of the end face that forms the abutment of the insertion bevel, is engaged from behind by the supporting element of the intake, and a prefixing of the filter element in the receiving chamber of the housing is achieved. The filter element can therefore not unintentionally come out of the receiving chamber.

This is then in particular important if the filter element is integrated into the receiving chamber against gravity during its insertion into the housing, the receiving chamber being formed in the air filtration housing. An upside-down installation of the filter element is thereby enabled, namely in a particularly simple manner.

The lid preferably has a closure element, which is rotatable relative to a basic body of the lid. In a closed position of the closure element, at least one supporting part of the closure element thereby engages behind a corresponding supporting part of the fastening element. In this way, a particularly secure fixing of the lid to the housing can be achieved, due to the interaction of the closure element with the fastening element. In particular, the closure element can be formed in the manner of a rotary closure.

The advantages described for the filter element according to the invention and preferred embodiments also apply for the air filtration device according to the invention, and vice versa.

Further advantages, features and details of the invention arise from the following description of preferred exemplary embodiments as well as from the drawings. The preceding features and combinations of features referred to in the description as well as the features and combinations of features referred to in the figure description and/or only illustrated in the figures hereinafter can be used not only in the respective combinations indicated, but also in other combinations or alone, without leaving the scope of the invention.

DETAILED DESCRIPTION OF THE DRAWINGS

Figure 1:
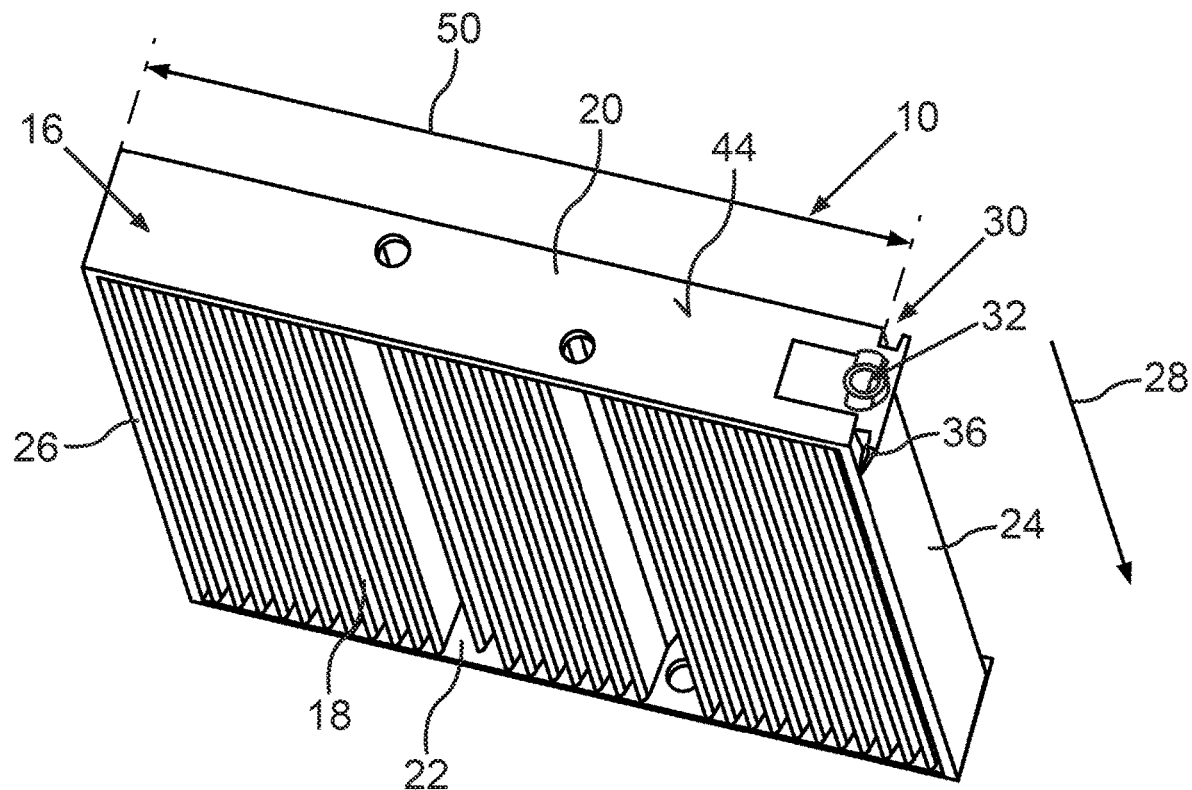
FIG. 1 shows a filter element for an air filtration device of a motor vehicle, in a schematic perspective view.

In the figures, identical or functionally identical elements are provided with the same reference numerals.

Figure 5:
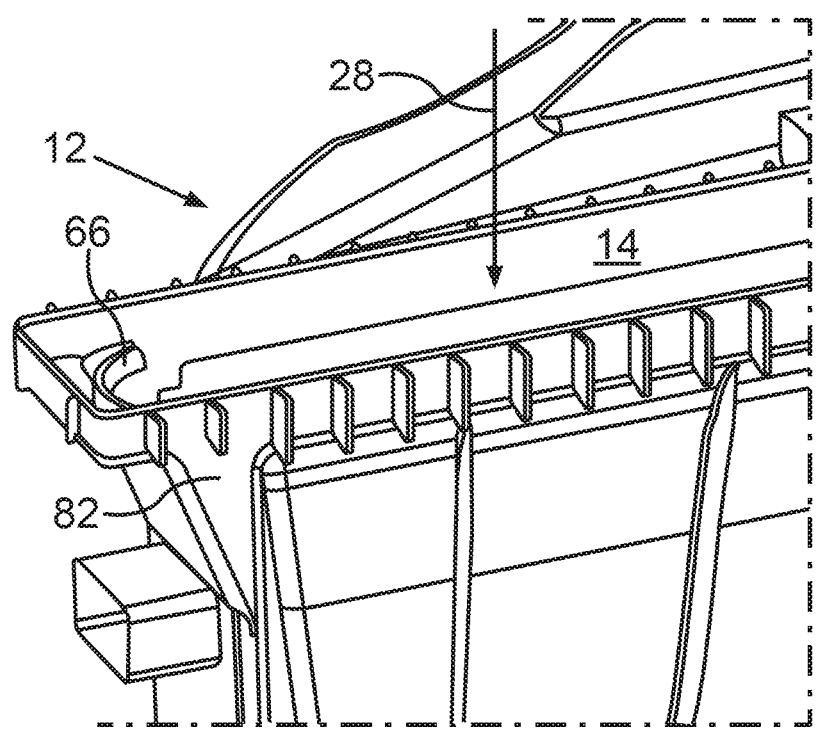
FIG. 5 shows an air filter housing into which the filter element can be introduced according to FIG. 1, in a sectional and a perspective view.

A filter element 10 is shown in a schematic perspective view in FIG. 1, which is intended for installation in a housing 12 (see FIG. 5) of an air filtration device of a motor vehicle. A receiving chamber 14 (see FIG. 5) is formed in the housing 12 of the air filtration device, in which receiving chamber the filter element 10 shown in FIG. 1 can be integrated or installed.

The filter element 10 comprises a frame 16, which surrounds or borders a filter material 18 of the filter element 10. When the filter element 10 is formed as a pleated filter, the filter material 18 can have a plurality of pleats, as is exemplarily shown herein. However, other embodiments of the filter material 18, through which air can flow during the operation of the filter element 10, are also possible.

The frame 16, which, in the present case, completely surrounds or encloses the filter material 18 on its periphery, comprises a front wall 20 and, in the present case, a back wall 22 that lies opposite to the front wall 20. The front wall 20 and the back wall 22 are connected to one another by two side walls 24, 26 of the frame 16.

The filter element 10 can be inserted into the receiving chamber 14 (see FIG. 5) in an insertion direction 28, which is illustrated in FIG. 1 by an arrow. The side walls 24, 26 consequently extend from the front wall 20, going outwards in the insertion direction 28 towards the back wall 22. The frame 16 is therefore essentially formed as a rectangle in the present case, wherein, depending on the shape of the receiving chamber 14, other shapes of the frame 16 are also possible.

Figure 2:
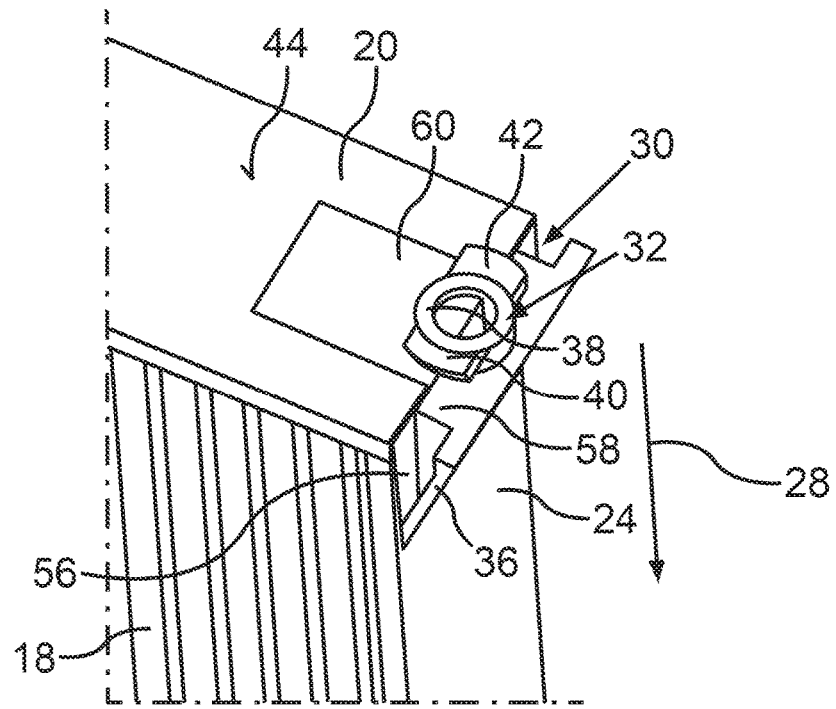
FIG. 2 shows a section of a region of a frame of the filter element in a magnified detail view, in which a component is arranged on the frame, by which an insertion bevel and a fastening element are provided.

In the region of the front wall 20, a component 30 is arranged on the frame 16, which is shown in FIG. 2 in a magnified detail view of the frame 16 and in FIG. 3, again in perspective view and separate from the frame 16.

A fastening element 32 is firstly provided by the component 30, the fastening element serving to fix a lid 34 (see FIG. 7) to the housing 12. Furthermore, an insertion bevel 36 is provided by the component 30, the function of which insertion bevel is explained in more detail using FIG. 4.

The present fastening element 32, which is formed in the manner of a pin 38 with supporting parts in the shape of a first wing 40 and of a second wing 42, protrudes from a front side 44 of the front wall 20. The lid 34 can be fixed to the wings 40, 42 of the fastening element 32 that are distanced from the front wall 20 by means of a closure element formed as a rotary closure 46 (see FIG. 7). The fastening element 32 therefore ensures that the lid 34 can only be attached to the housing 12 if the filter element 10 is installed in the housing 12, and namely in that the lid 34 is fixed to the fastening element 32 of the filter element 10.

Figure 12:
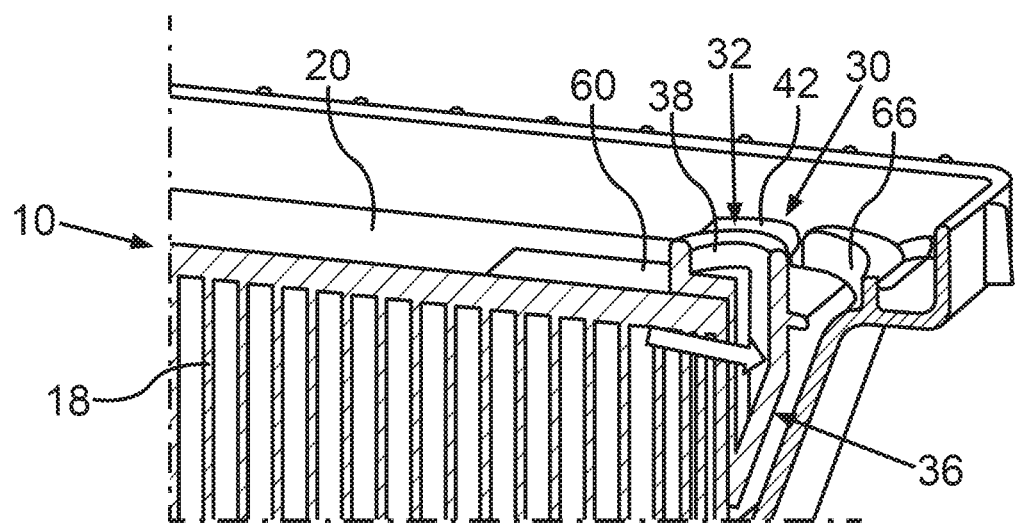
FIG. 12 shows the bouncing back of the front wall to its non-deformed original state, in which a supporting element formed on the side of the housing is engaged from behind by the component.
Figure 13:
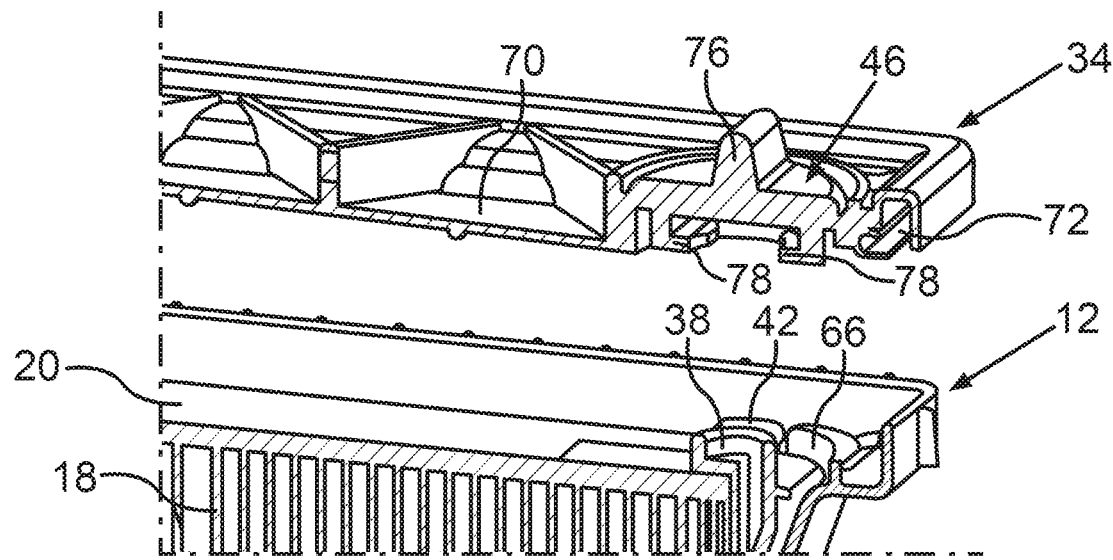
FIG. 13 shows a first step in the attachment of the lid according to FIG. 7 to the housing according to FIG. 5, wherein the filter element according to FIG. 1 is arranged in the receiving chamber of the housing.

Furthermore, a pre-fixing of the filter element 10 in the receiving chamber 14 of the housing 12 is achieved by means of the component 30 that has the insertion bevel 36, as long as the lid 34 is not yet fixed to the housing 12 (see FIG. 12 and FIG. 13).

Figure 4:
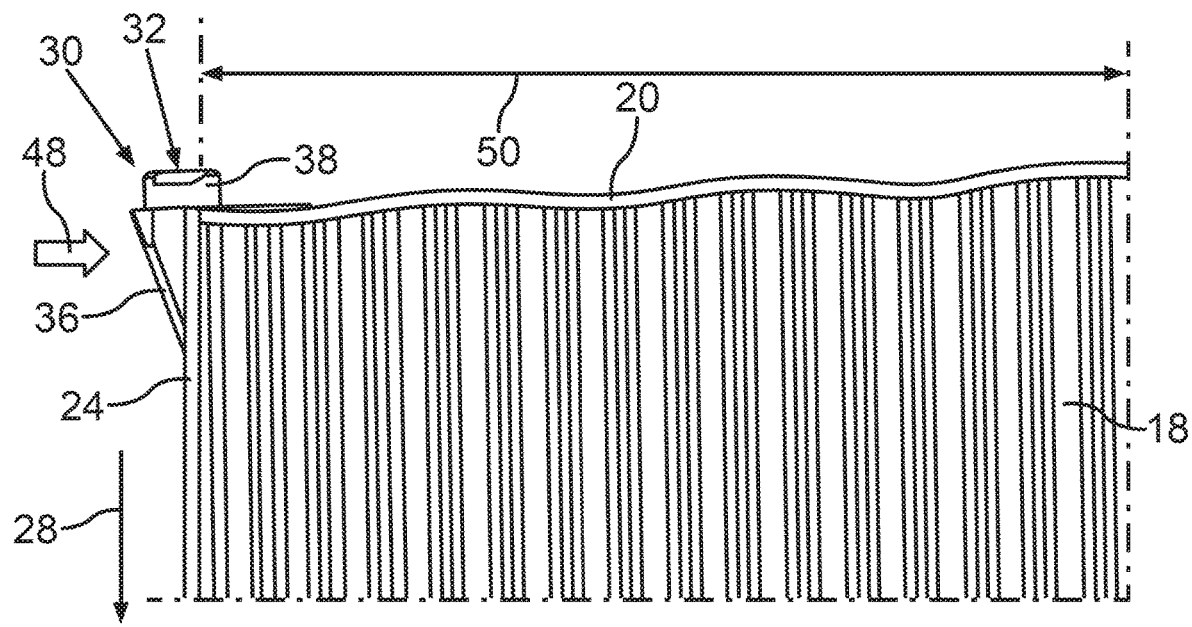
FIG. 4 shows the elastic deformation of a front wall of the frame of the filter element due to an application of force to the component from the side.

The insertion bevel 36 of the component 30 initially ensures an elastic deformation of the front wall 20 during the introduction or insertion of the filter element 10 into the receiving chamber 14 formed in the housing 12 (see FIG. 5) in the insertion direction 28, since the insertion bevel 36 extends the filter element 10 towards a specified entrance width of the fixed receiving chamber 14, so that during insertion, a force or a pressure is exerted on the insertion bevel 36, which acts on the front wall 20 of the filter element. The corresponding compression of the front wall 20 is shown in FIG. 4. The compression or the elastic deformation of the front wall 20 is thereby effected by a force exerted on the insertion bevel 36, which is illustrated by an arrow 48 in FIG. 4.

In the elastically deformed or compressed state of the front wall 20, a longitudinal dimension 50 that is occupied by the front wall 20, perpendicular to the insertion direction 28 (see FIG. 1) is smaller than in an original state of the front wall 20, in which the front wall 20 is not deformed. The shortened longitudinal dimension 50 of the frame 16 perpendicular to the insertion direction 28 in the region of the front wall 20 is, as is schematically shown in FIG. 4, in particular caused by the front wall 20 being bent or deformed towards the filter material 18 and/or away from the filter material 18. This respective elastic deformation of the front wall 20 in this way is herein caused by the insertion bevel 36, which is provided by the component 30. The insertion bevel 36 is, together with the filter element 10, forced through a narrow opening of the housing 12 into the receiving chamber 14, in which sufficient space is once again available so that the filter element 10 can expand back into its original shape.

For example, the insertion bevel 36 can comprise two guide slopes 52, 54 (see FIG. 3), which are aligned diagonally to the side wall 24 (see FIG. 4), in the end region of which the component 30 is attached to the front wall 20. The force (see arrow 48) is herein applied to these guide slopes 52, 54, which causes the compression or elastic deformation of the front wall 20.

The insertion bevel 36 in the present case furthermore comprises a plate-shaped base part 56, which lies on the side wall 24 of the frame 16 (see FIG. 2 and FIG. 4). A stiffening element 58 of the insertion bevel 36 is arranged between the base part 56 and the guide slopes 52, 54 (see FIG. 3). This means that the insertion bevel 36 is given an overall high stiffness or rigidity. In other words, the guide slopes 52, 54 cannot be moved towards the plate-shaped base part 56 if the front wall 20 has the force applied to it in the region of the component 30, perpendicular to the insertion direction 28 or in the direction of the longitudinal dimension 50, which is illustrated in FIG. 4 by the arrow 48.

The insertion bevel 36 and respectively the component 30 additionally has a locating flange 60, which extends along the front wall 20 and abuts the front side 44 of the front wall 20, or rests on the front side 44 of the front wall 20.

An upper side 62 of the locating flange 60 and of the stiffening element 58 are associated with an end face of the insertion bevel 36, which is flush with the front wall 20. Abutments 64 are provided in the region of the guide slopes 52, 54 by this end face of the insertion bevel 36. The abutments 64 engage behind a respective supporting element 66, which is provided or formed on the side of the air filter housing 12 (see FIG. 5 and FIG. 6), when the filter element 10 is integrated into the receiving chamber 14.

Figure 6:
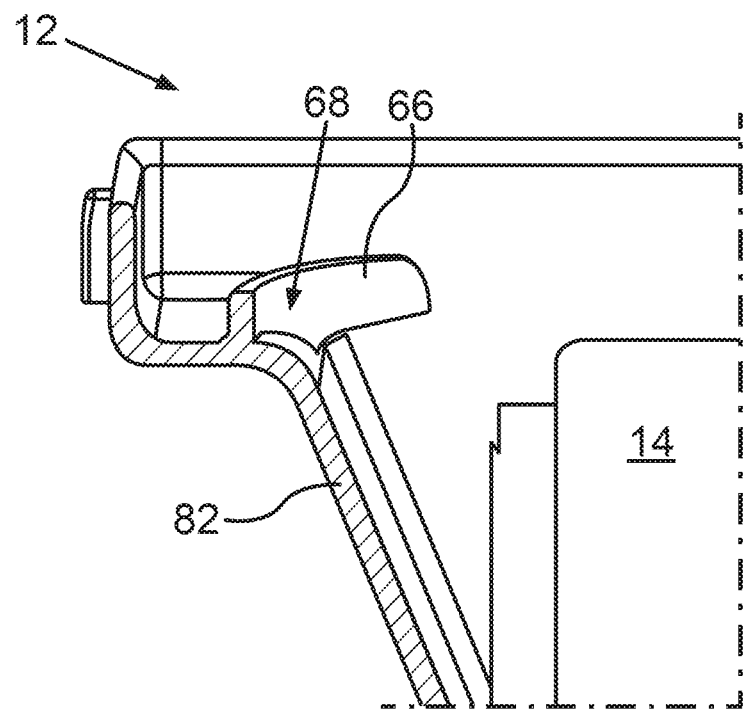
FIG. 6 shows a section of the housing according to FIG. 5, in a partially cut view.

In this regard it is in particular apparent from FIG. 6 that the respective supporting element 66 is associated with an intake that is formed as a holding recess 68, into which the shaft or pin 38 of the fastening element 32 can be introduced, together with the wings 40, 42. In this context, the supporting elements 66 are formed in the manner of arms, which partially delimit a receiving chamber of the holding recess 68 in the peripheral direction, in which the fastening element 32 can be arranged.

The holding recess 68, which serves as the intake for the fastening element 32, is formed on a side housing wall 82 of the housing 12 in the present case. The holding recess 68 can in particular be formed integrally with the housing wall 82 (see FIG. 5 and FIG. 6), which delimits the receiving chamber 14 on one side.

Figure 7:
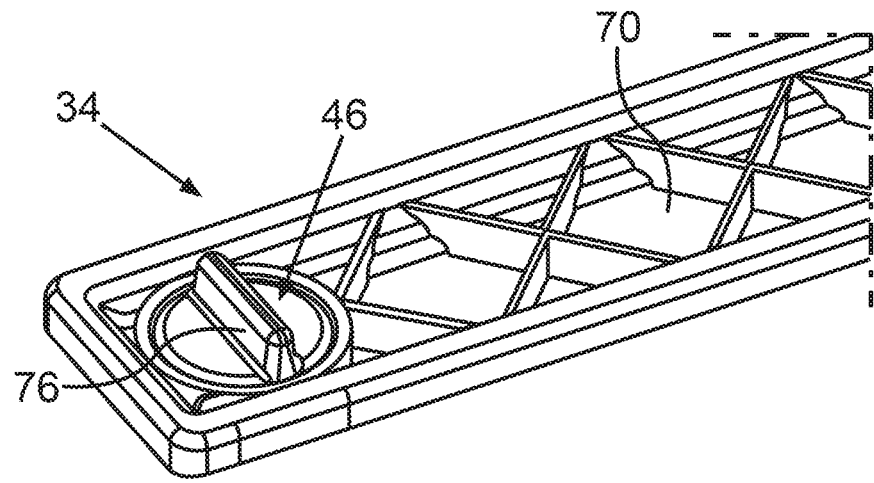
FIG. 7 shows a lid of the air filtration device, by means of which a receiving chamber for the filter element according to FIG. 1, which is formed in the housing according to FIG. 5, can be sealed, in a sectional view.

In FIG. 7, the lid 34 of the air filtration device is shown, in an external view. Therefore, the lid 34 comprises a basic body 70 and the rotary closure 46 that is rotatable relative to the basic body 70.

Figure 8:
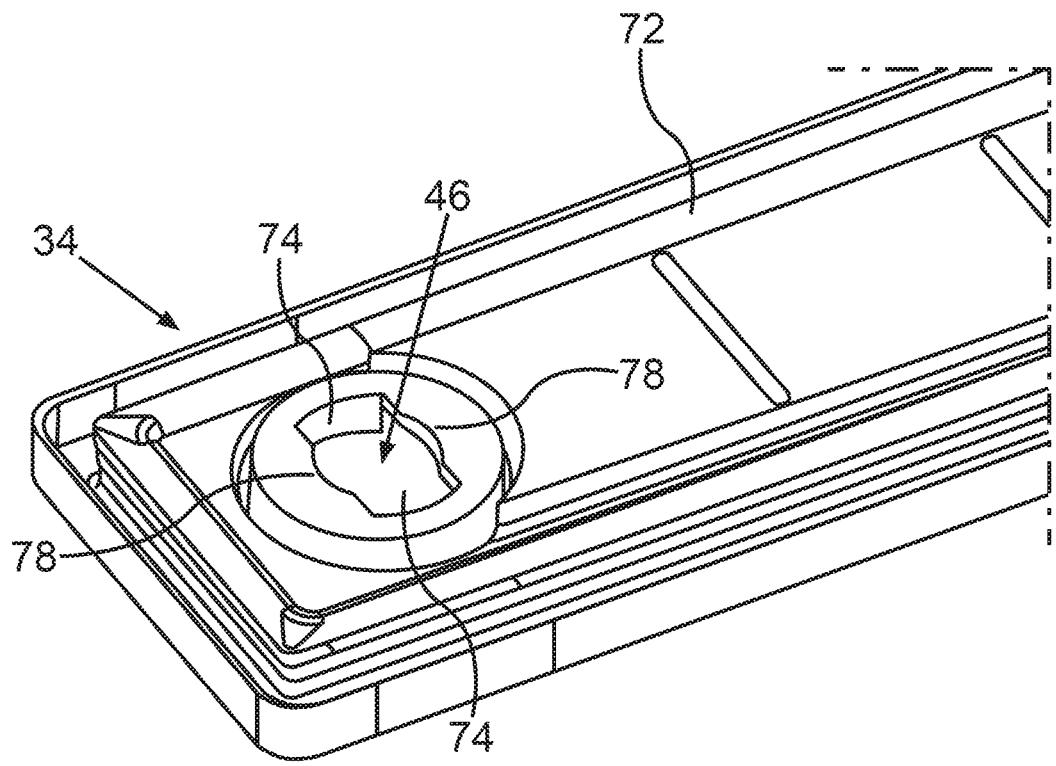
FIG. 8 shows a magnified view of an underside of the lid according to FIG. 7.

In FIG. 8, the rotary closure 46 is shown in a view of its underside, which is facing the receiving chamber 14. Likewise, in FIG. 8, that side of the basic body 70 of the lid 34 can be seen, which is facing the receiving chamber 14 when the lid 34 is fixed to the housing 12. Therefore, the lid 34 can have a sealing element 72 on this underside.

Figure 3:
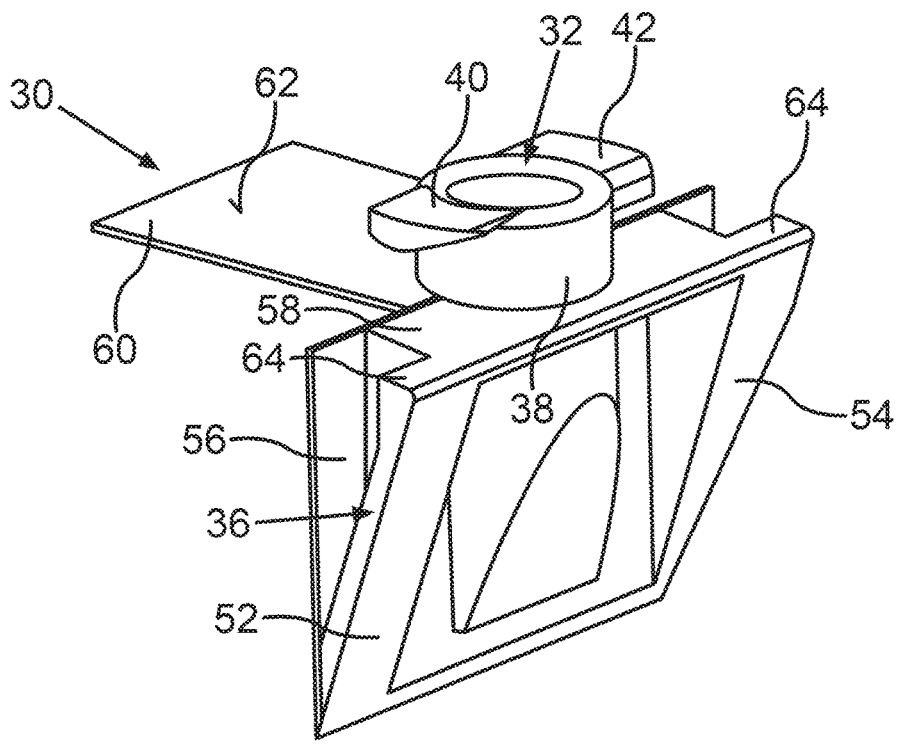
FIG. 3 shows the component shown in FIG. 2, in a magnified perspective view.

Moreover, it is apparent in FIG. 8 that recesses 74 are formed in the rotary closure 46, the contours of which correspond to a respective contour of the wings 40, 42 that are formed on the fastening element 32 (see FIG. 3).

The installation of the filter element 10 in the air filtration device, or the integration of the filter element 10 into the receiving chamber 14 of the air filter housing 12, in such a way that the fastening element 32 enters the holding recess 68 and the abutments 64 thereby engage behind the respective supporting elements 66 of the holding recess 68, is explained in the following, referencing FIG. 9 to FIG. 12.

Figure 9:
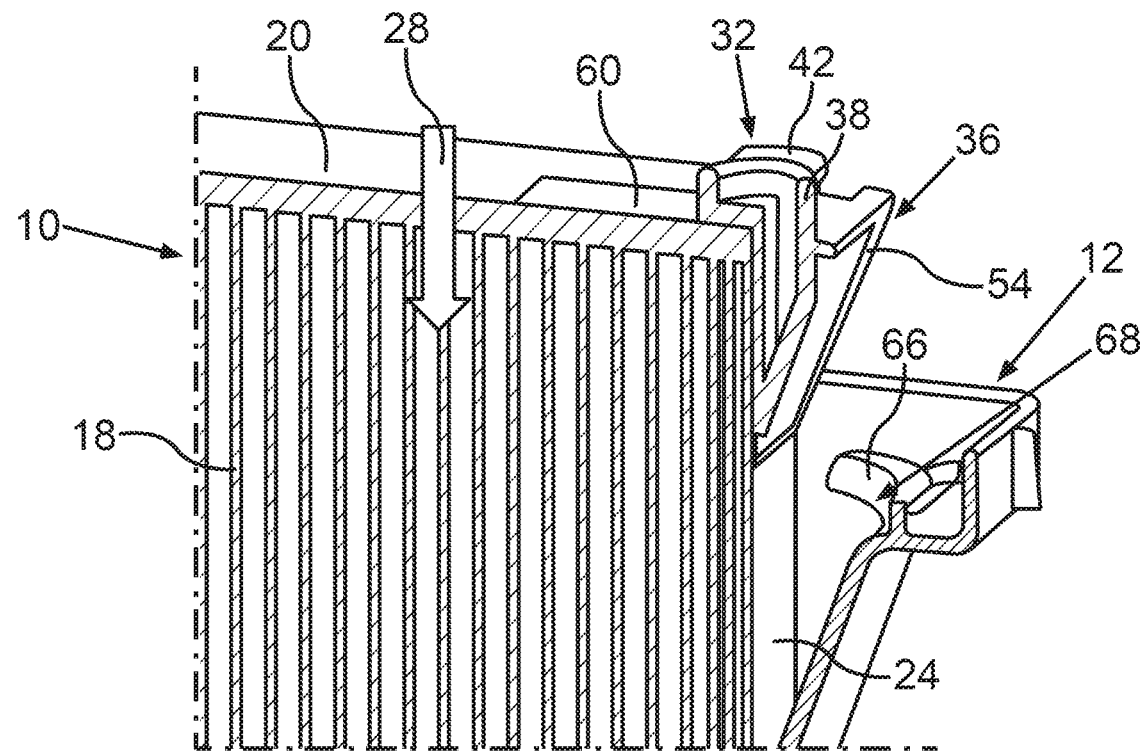
FIG. 9 shows a first step during an insertion of the filter element according to FIG. 1 into the housing according to FIG. 5, in a partially cut perspective view.
Figure 10:
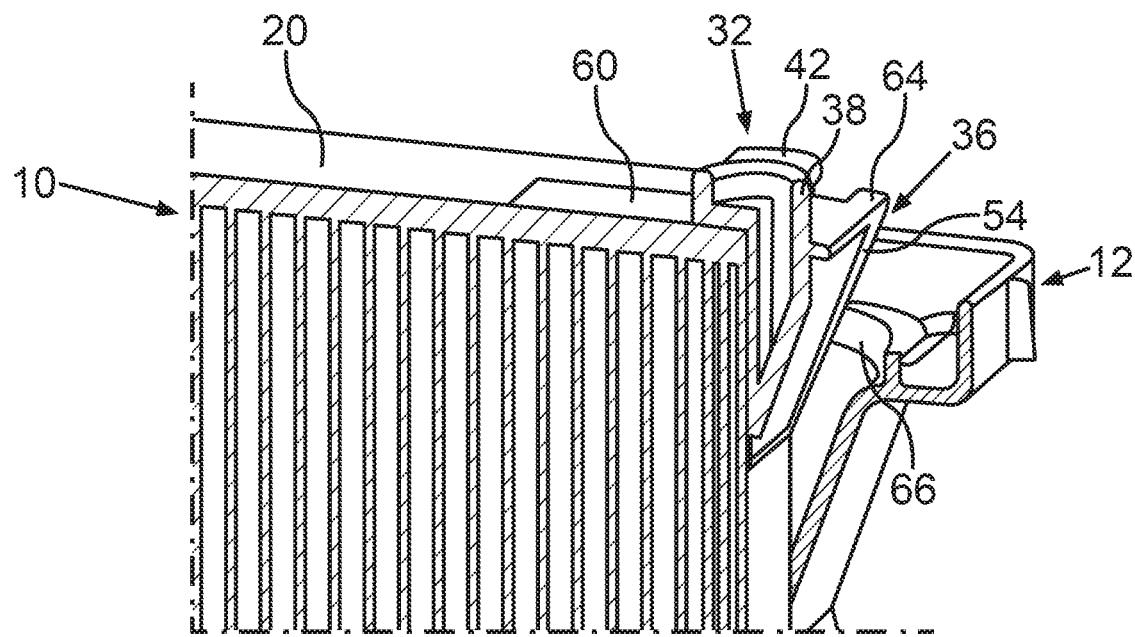
FIG. 10 shows a second step during inserting the filter element according to FIG. 1 into the housing according to FIG. 5, in a partially cut perspective view.

According to FIG. 9, the filter element 10 is introduced into the housing 12 in the insertion direction 28. In this way, each one of the guide slopes 52, 54 enters into contact with a respective supporting element 66 of the holding recess 68 (see FIG. 10). The force that is applied to the insertion bevel 36 during the further insertion in the insertion direction 28 causes the elastic deformation of the front wall 20. This is exaggeratedly shown in FIG. 11, wherein the force acting on the insertion bevel 36 is illustrated in FIG. 11 as well as in FIG. 4 by the arrow 48.

Figure 11:
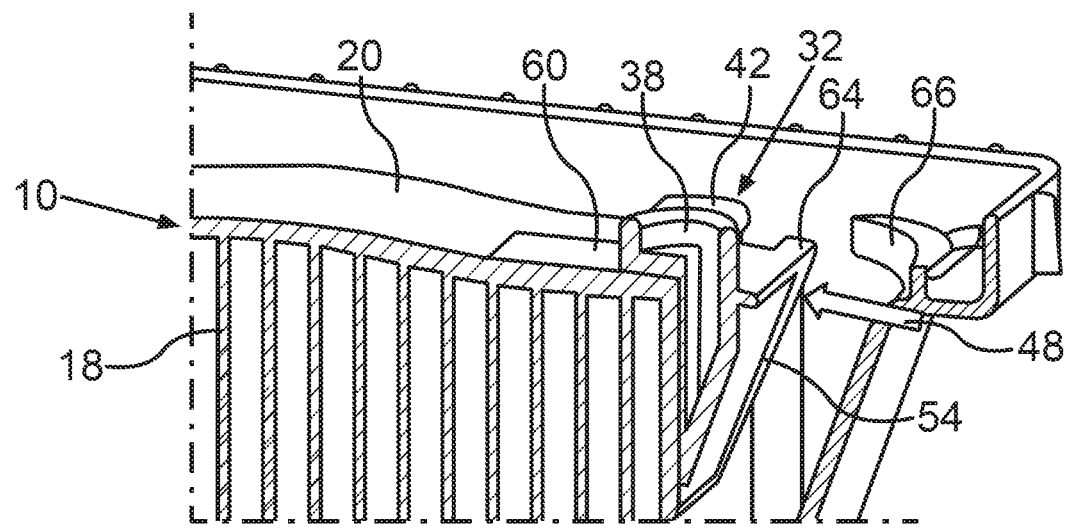
FIG. 11 shows the elastic deformation of the front wall of the filter element according to FIG. 1, due to the application of a force to the insertion bevel of the component shown in FIG. 3.

The front wall 20 that is compressed or elastically deformed according to FIG. 11 then reassumes its original state according to FIG. 12, in which the front wall 20 is not deformed, rather it is aligned straight again. Due to the front wall 20 snapping back into its original state, the abutments 64 go behind the supporting elements 66 that are formed in the area of the holding recess 68. The insertion bevel 36 thereby undercuts the holding recess 68 in a tight fit. The filter element 10 has then attained the predetermined final position in the receiving chamber 14 of the housing 12.

With the attainment of the final position of the filter element, the abutments 64 therefore latch behind the supporting elements 66 with an undercut, the supporting elements being formed on the holding recess 68. In this way, the wings 40, 42 are also aligned in the correct position, whereby a clamping geometry and a holding geometry of the fastening element 32 are provided, and the lid 34 can be mounted.

This fastening of the lid 34 to the housing 12 is illustrated with reference to FIG. 13 to FIG. 15. According to the sectional view in FIG. 13, the lid 34 is first attached to the housing 12, wherein the recesses 74 of the rotary closure 46 that correspond with the wings 40, 42 interlock. Then, the rotary closure 46 can be gripped and rotated (see FIG. 14) on a bar or similar handle part 76 (see FIG. 7).

The two supporting parts 78 (see FIG. 8) of the rotary closure 46 are, then, thereby also turned with it, so that that they engage behind the wings 40, 42 on the pin 38 on the component 30 of the filter element 10. This turning of the rotary closure 46 is represented in FIG. 14, wherein a direction of rotation of the rotary closure 46 is illustrated by a curved arrow 80. In FIG. 15, the rotary closure 46 is then shown in its closed position.

By the supporting parts 78 of the rotary closure 46 engaging behind the wings 40, 42 of the fastening element 32, the lid 34 is herein brought into a tightly fitting position on the housing 12. This is because the abutments 64, which are provided on the end face of the insertion bevel 36 (see FIG. 3), lie on the supporting elements 66 of the holding recess 68.

The supporting parts 78 of the rotary closure 46 correspond to the wings 40, 42, which form the clamping geometry and the holding geometry of the fastening element 32. In this regard it is in particular apparent in FIG. 3 that the wings 40, 42 can be formed in a tapering, ramp shape going against the direction of rotation of the rotary closure 46, which is illustrated in FIG. 14 by the arrow 80. Therefore, the supporting parts 78 of the rotary closure 46 run aground on the respective ramps of the wings 40, 42 if the supporting parts 78 engage behind the wings 40, 42 and the rotary closure 46 is turned further in the direction of rotation that is illustrated by the arrow 80. A particularly high tightness between lid 34 and housing 12 is thereby attained, as the fastening element 32 that is held on the supporting element 66 of the housing 12 with an undercut and the ramp-shaped wings 40, 42 cause the lid 34 to be pulled towards the housing 12 during the tightening of the supporting parts 78.

Figure 16:
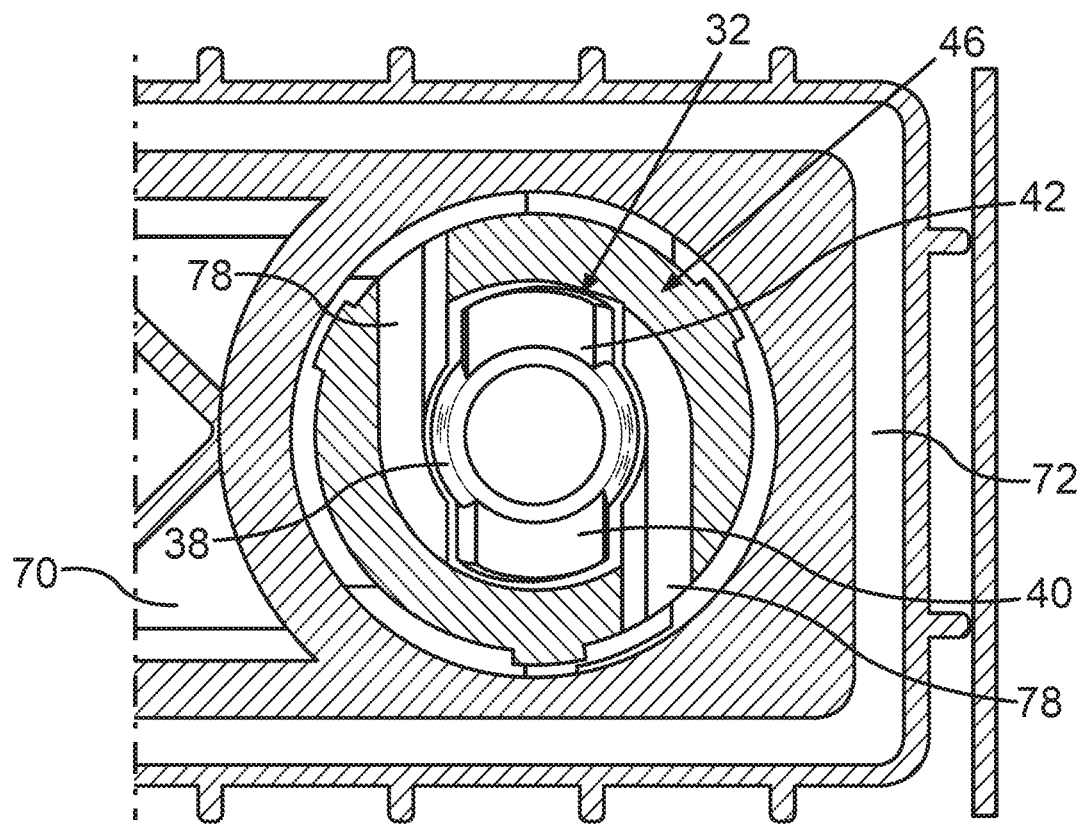
FIG. 16 shows the state of the air filtration device according to FIG. 14, in a partially cut top view.

In FIG. 16, the lid 34 is shown intersected in the region of the rotary closure 46. In this way, the alignment of the rotary closure 46 that the rotary closure 46 has in FIG. 14 is illustrated in FIG. 16. This means the supporting parts 78 still do not engage behind the wings 40, 42.

Figure 17:
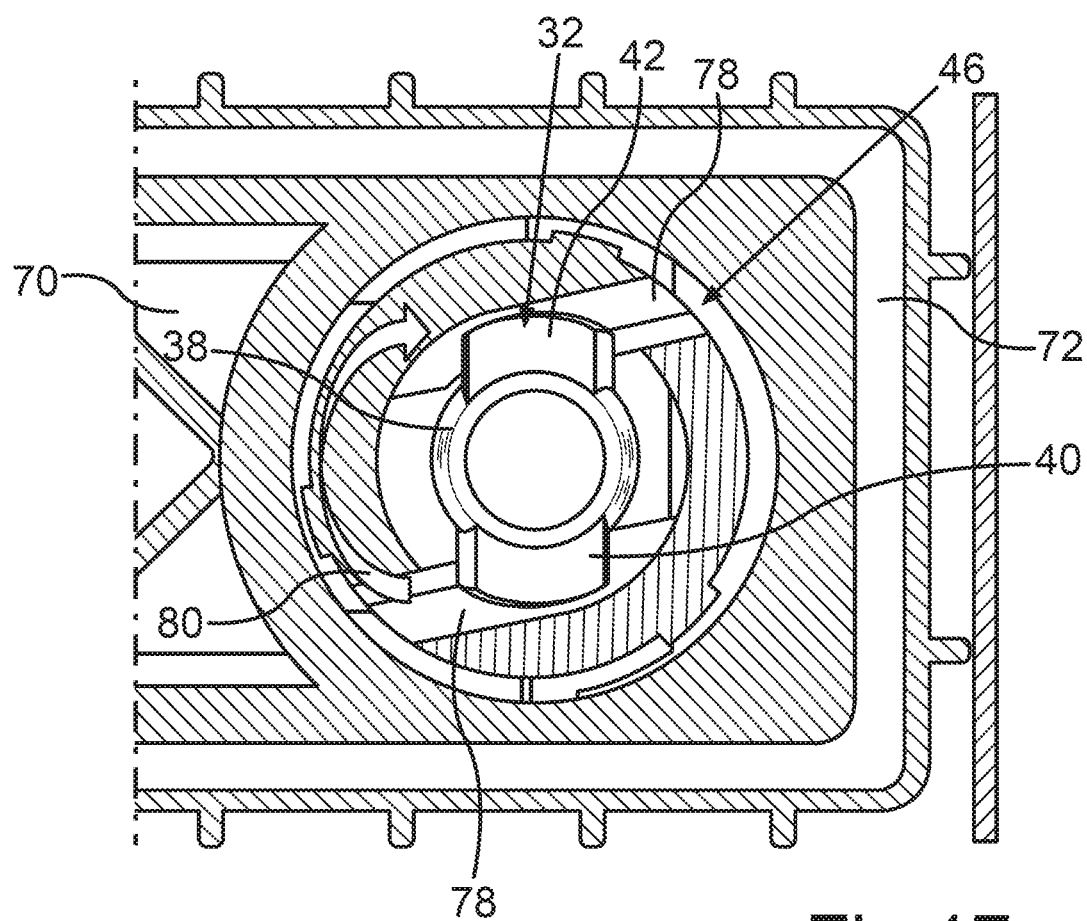
FIG. 17 shows the state of the air filtration device according to FIG. 15, i.e., with a rotary closure that is moved into a closed position, in a partially cut top view.

In FIG. 17, the rotary closure 46 is, by contrast, shown in its closed position, in which the supporting parts 78 engage behind the wings 40, 42. The undercut that is thereby achieved ensures a tightly fitting fixation of the lid 34 to the housing 12, due to the interaction of the rotary closure 46 with the fastening element 32.

Figure 14:
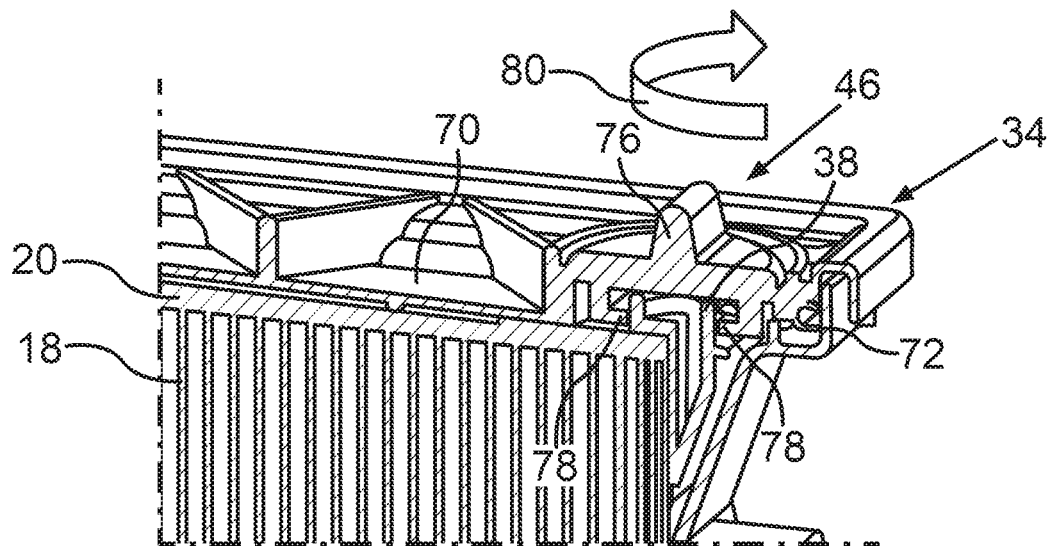
FIG. 14 shows the fitting of the lid onto the housing and the rotation of a closure element of the lid that is formed as a rotary closure.
Figure 15:
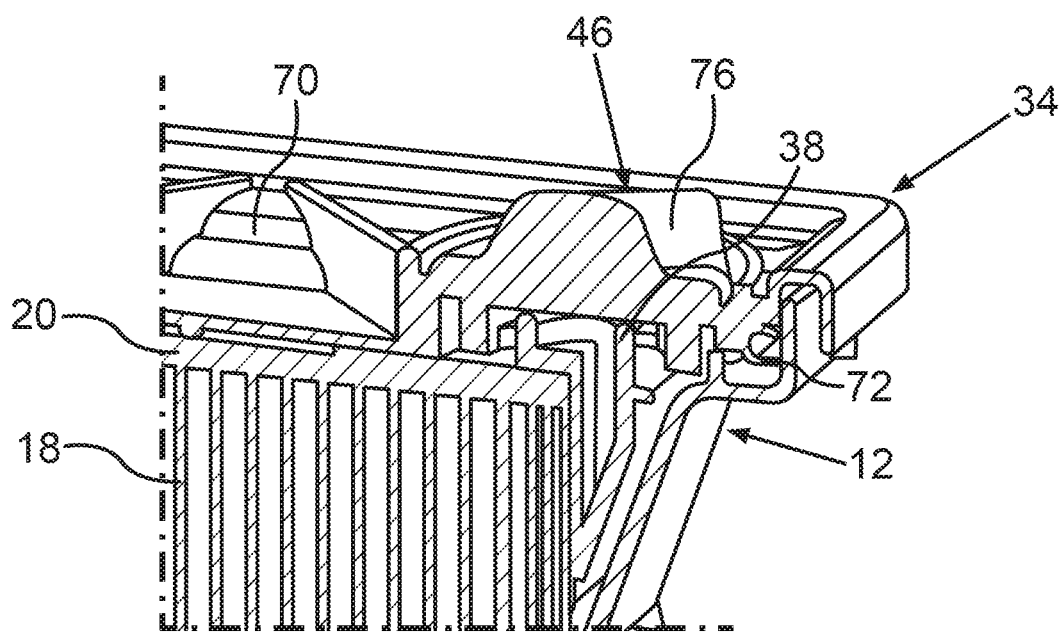
FIG. 15 shows the housing with in-built filter element and lid that is fixed to the housing, in a partially cut and sectional view.

During disassembly, the rotary closure 46 is brought back into its open position, that is shown in FIG. 14. The lid 34 can then be taken off the housing 12. Finally, the filter element 10 can be taken out of the receiving chamber 14, wherein the front wall 20, as is schematically shown in FIG. 4, is elastically deformed again, which can, for example, happen due to a manual intervention in the filter material 18, by means of the filter material 18 being contracted, together with the front wall 20 that is adhered to it.

The invention claimed is:

1. A filter element (10) for an air filtration device of a motor vehicle, comprising:
   a frame (16) which at least partially surrounds a filter material (18) of the filter element (10), wherein the frame (16) comprises an elastically deformable front wall (20) which extends perpendicularly to an insertion direction (28) in which the filter element (10) is insertable in a receiving chamber (14) of a housing (12) of the air filtration device;
   a fastening element (32), wherein a lid (34) of the air filtration device is fixable on the fastening element (32) and wherein the lid (34) is configured for closing the receiving chamber (14);
   an insertion bevel (36), wherein via the insertion bevel (36) the front wall (20) can be brought into an elastically deformed state during an insertion of the filter element (10) into the receiving chamber (14), wherein in the elastically deformed state a longitudinal dimension (50) of the front wall is smaller than in an undeformed original state of the front wall (20), and wherein the insertion bevel (36) has a plate-shaped base part (56) which lies on a side wall (24) of the frame (16), at least one guide slope (52, 54) which extends diagonally away from the side wall (24), and a stiffening element (58) which is disposed between the plate-shaped base part (56) and the at least one guide slope (52, 54); and
   an inherently rigid component (30) mounted on the frame (16) in an area of the front wall (20), wherein the fastening element (32) is formed integrally with the inherently rigid component (30) and wherein the inherently rigid component (30) has the insertion bevel (36).

2. The filter element according to claim 1, wherein the fastening element (32) is disposed on the front wall (20) and protrudes from the front wall (20) counter to the insertion direction (28).

3. The filter element according to claim 1, wherein the inherently rigid component (30) has a locating flange (60) which lies on the front wall (20).

4. The filter element according to claim 1, wherein the insertion bevel (36) has an end face by which an abutment (64) is provided which is configured to engage behind a supporting element (66) of the housing (12) of the air filtration device when the filter element (10) is integrated into the receiving chamber (14).

5. The filter element according to claim 1, wherein the fastening element (32) has at least one supporting part (40, 42) which is engageable from behind by a corresponding supporting part (78) of the lid (34) of the air filtration device.

6. Air filtration device for a motor vehicle, comprising:
   a housing (12) with a receiving chamber (14);
   a lid (34); and
   a filter element (10), wherein the filter element (10) comprises:
     a frame (16) which at least partially surrounds a filter material (18) of the filter element (10), wherein the frame (16) comprises an elastically deformable front wall (20) which extends perpendicularly to an insertion direction (28) in which the filter element (10) is insertable in the receiving chamber (14) of the housing (12);
     a fastening element (32), wherein the lid (34) is fixable on the fastening element (32) and wherein the lid (34) is configured for closing the receiving chamber (14);
     an insertion bevel (36), wherein via the insertion bevel (36) the front wall (20) can be brought into an elastically deformed state during an insertion of the filter element (10) into the receiving chamber (14), wherein in the elastically deformed state a longitudinal dimension (50) of the front wall is smaller than in an undeformed original state of the front wall (20), and wherein the insertion bevel (36) has a plate-shaped base part (56) which lies on a side wall (24) of the frame (16), at least one guide slope (52, 54) which extends diagonally away from the side wall (24), and a stiffening element (58) which is disposed between the plate-shaped base part (56) and the at least one guide slope (52, 54); and
     an inherently rigid component (30) mounted on the frame (16) in an area of the front wall (20), wherein the fastening element (32) is formed integrally with the inherently rigid component (30) and wherein the inherently rigid component (30) has the insertion bevel (36).

7. The air filtration device according to claim 6, wherein an intake (68) is formed on at least one housing wall (82) of the housing (12), wherein the fastening element (32) is accommodatable in the intake (68), and wherein the intake (68) has a supporting element (66) with which an abutment (64) of the insertion bevel (36) is contactable.

8. The air filtration device according to claim 6, wherein the lid (34) has a closure element (46) which is rotatable relative to a basic body (70) of the lid (34) and wherein, in a closed position of the closure element (46), at least one supporting part (78) of the closure element (46) engages behind a corresponding supporting part (40, 42) of the fastening element (32).

\* \* \* \* \*